May 26, 1942.  B. HALL  2,283,923
REFRIGERATING APPARATUS
Filed April 27, 1940  7 Sheets-Sheet 4
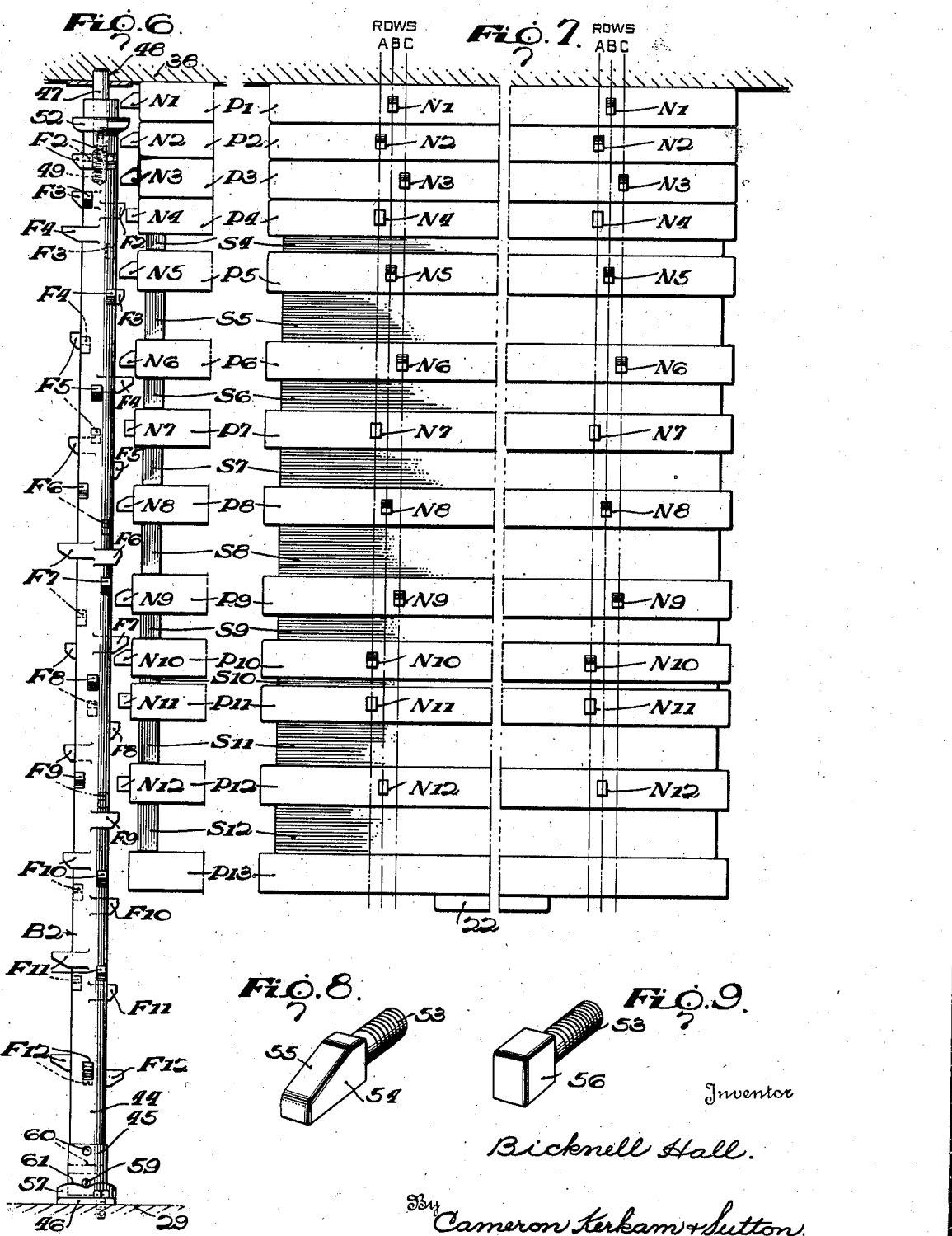

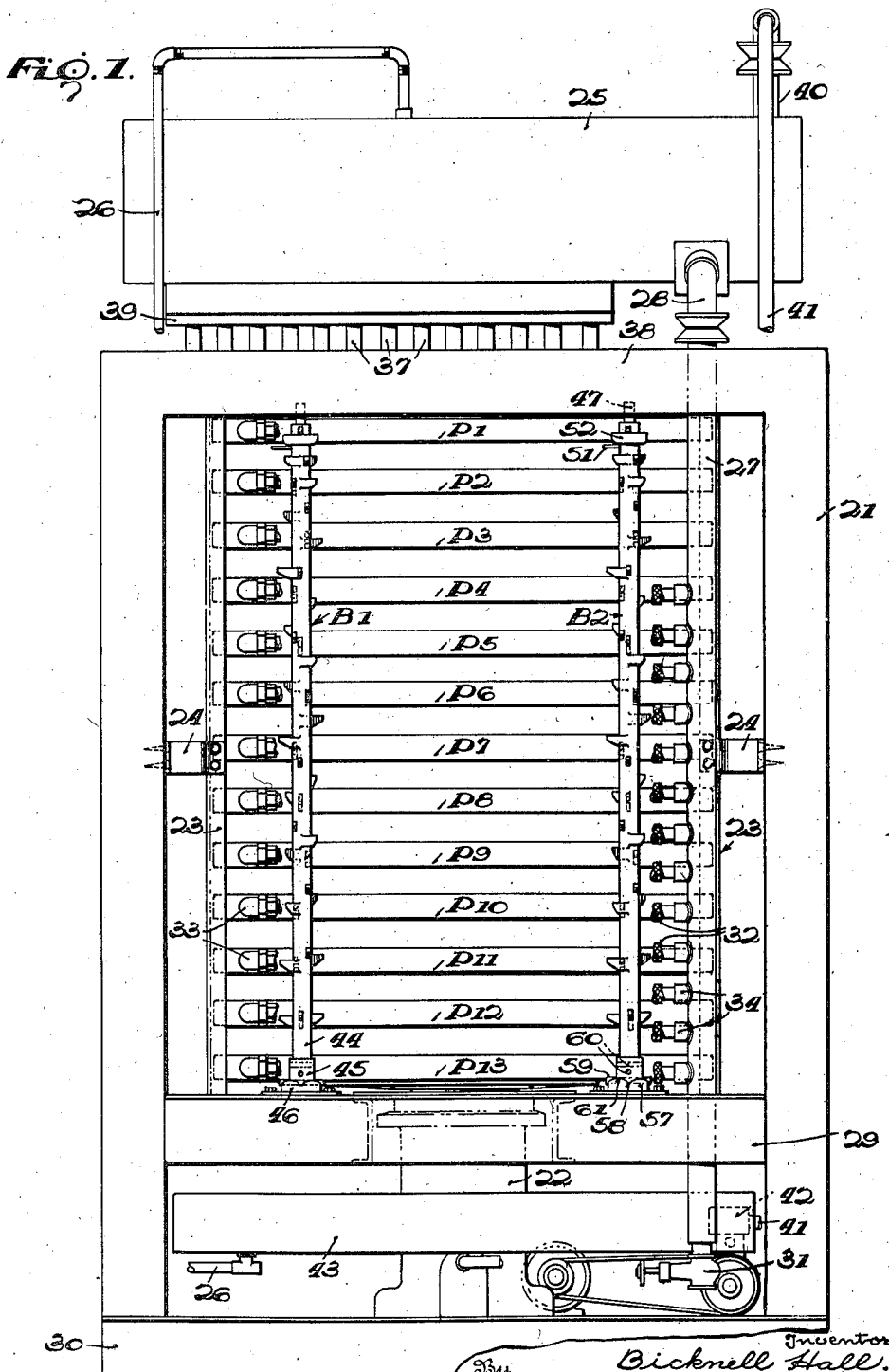

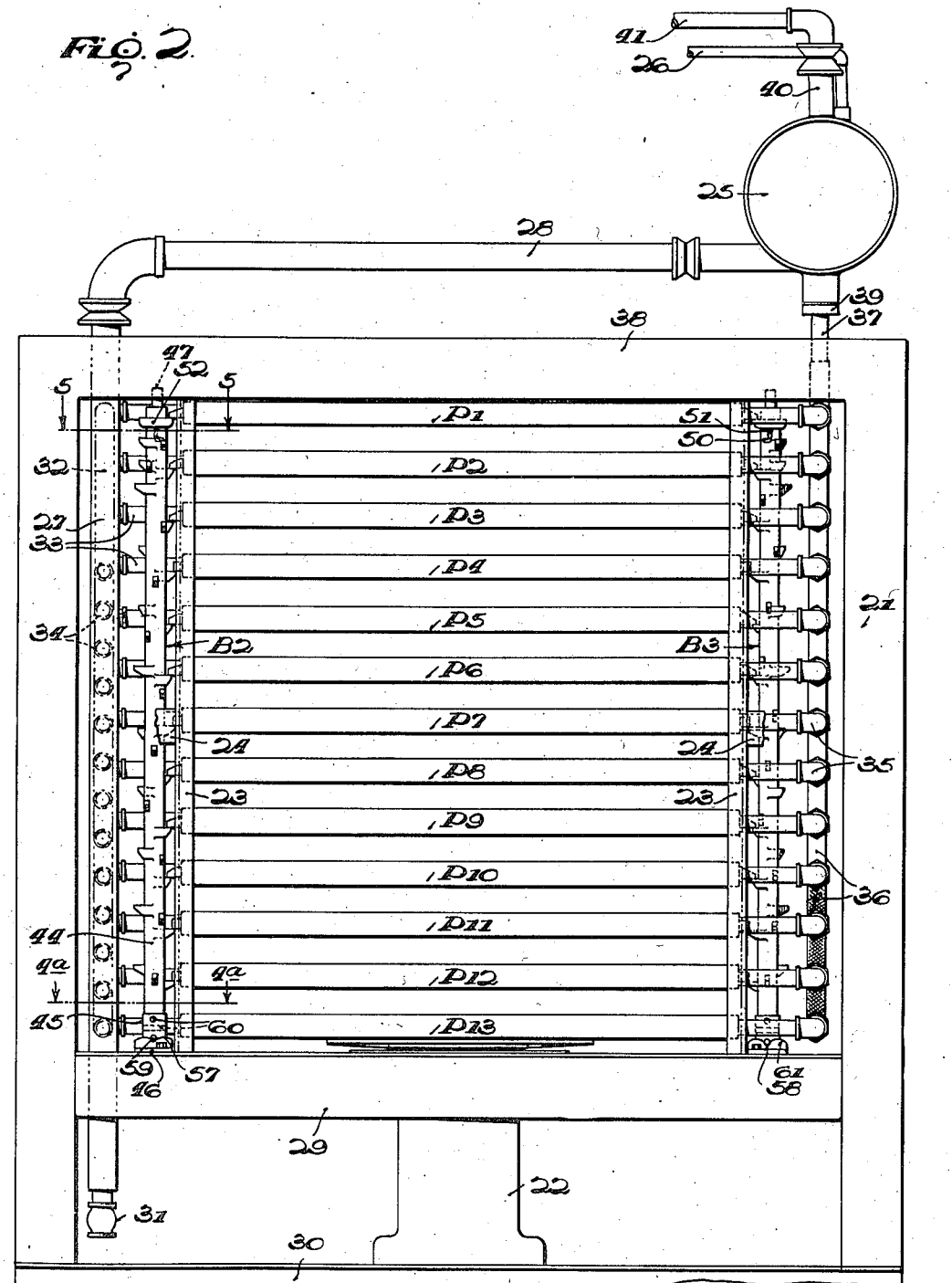

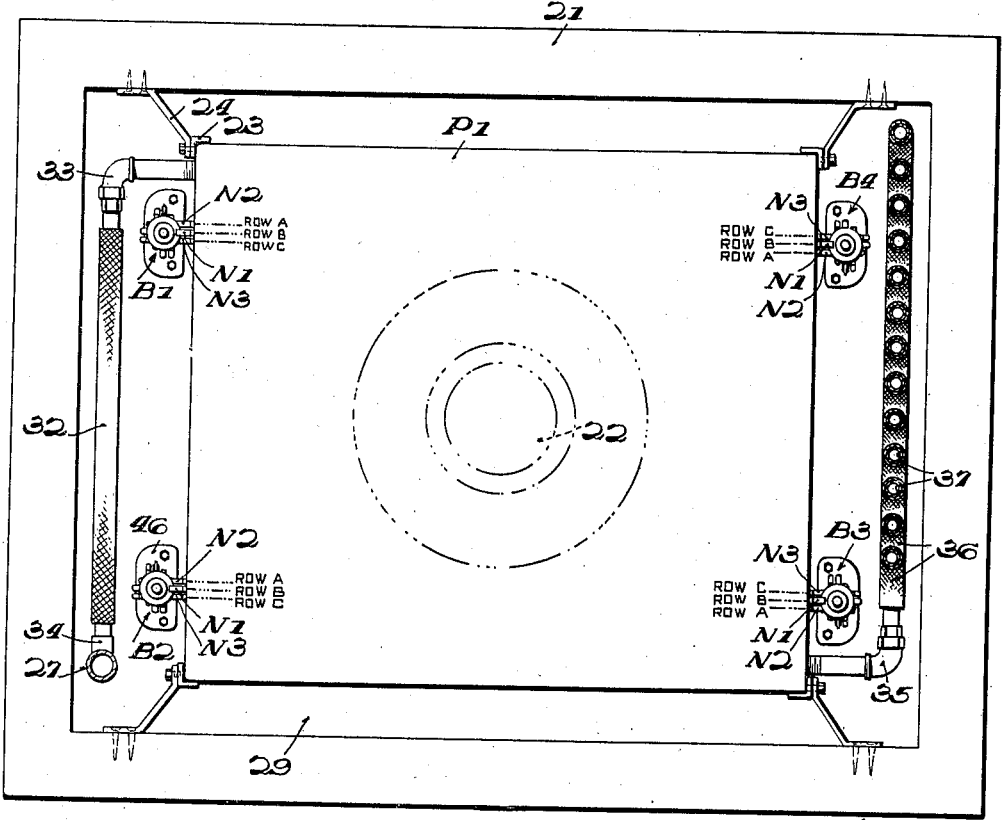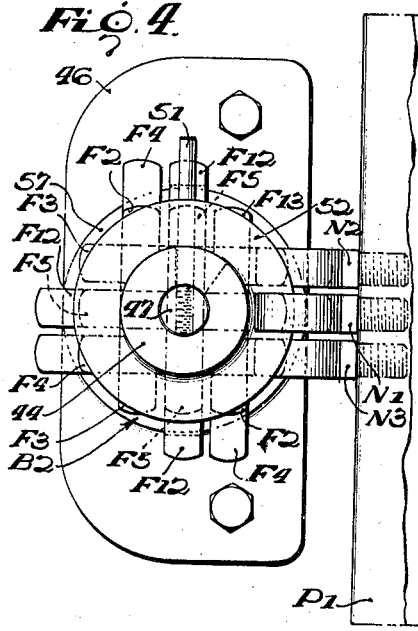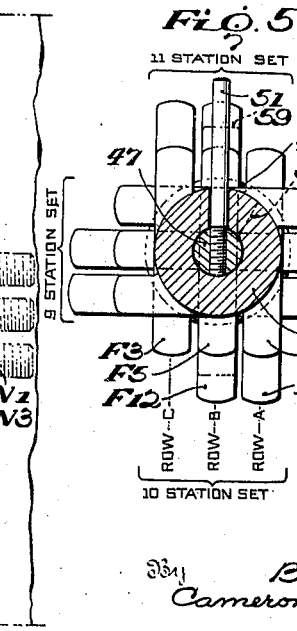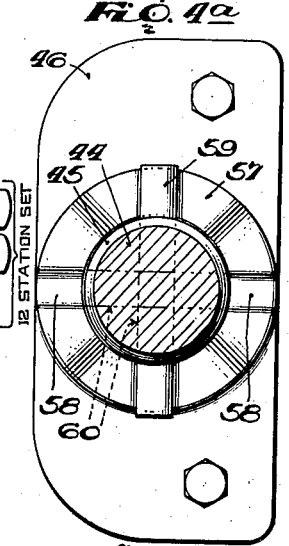

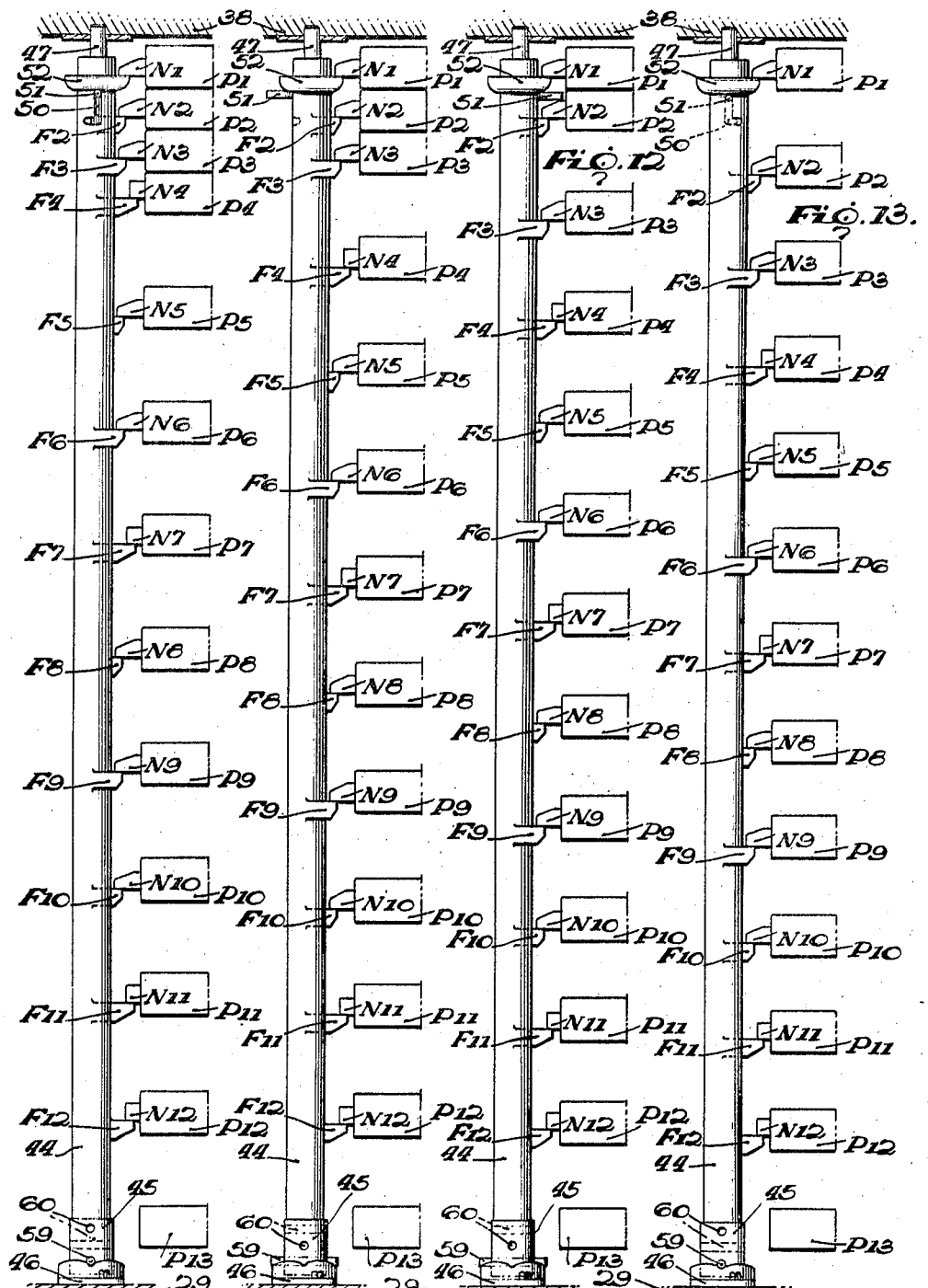

May 26, 1942.  B. HALL  2,283,923
REFRIGERATING APPARATUS
Filed April 27, 1940  7 Sheets-Sheet 6
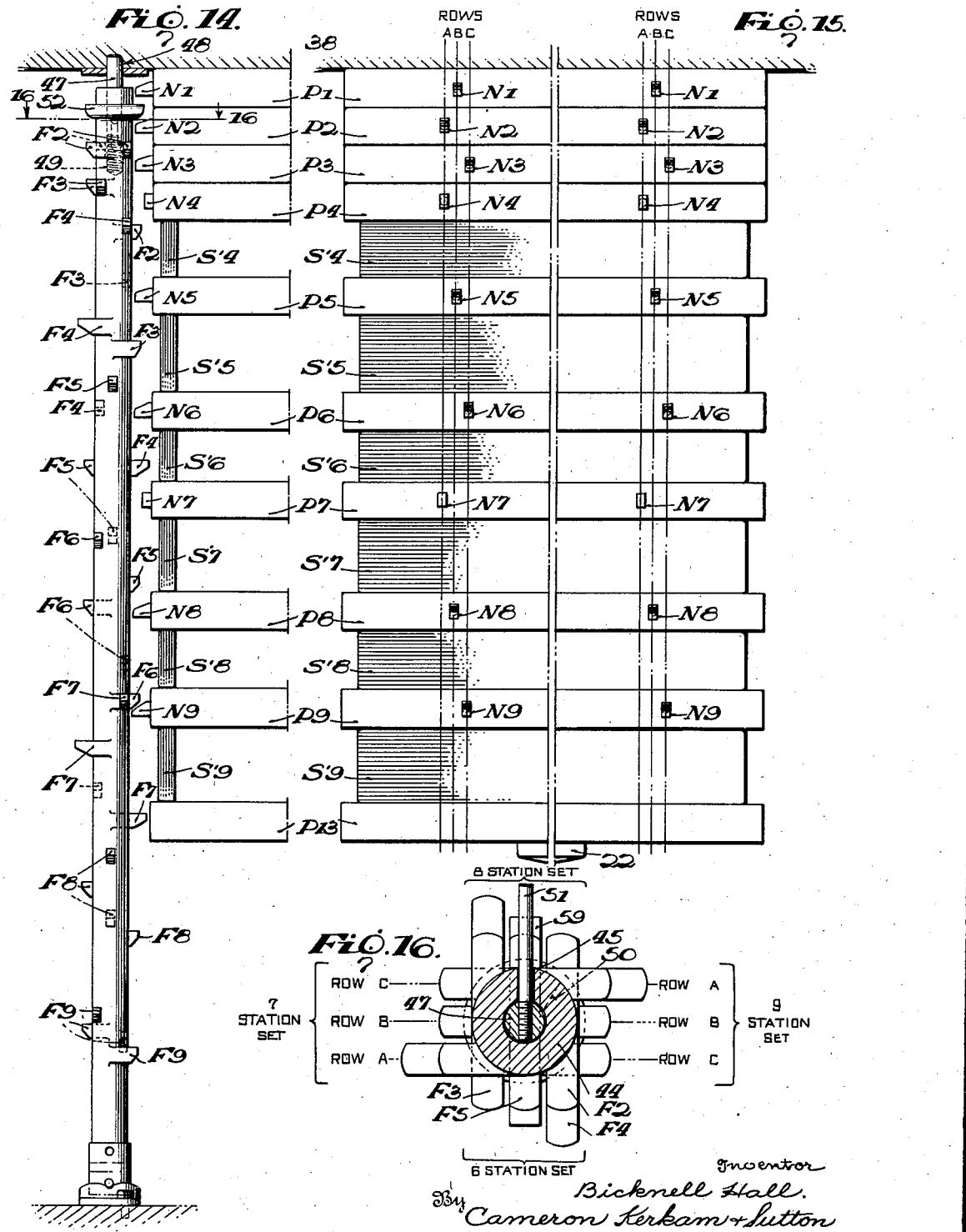

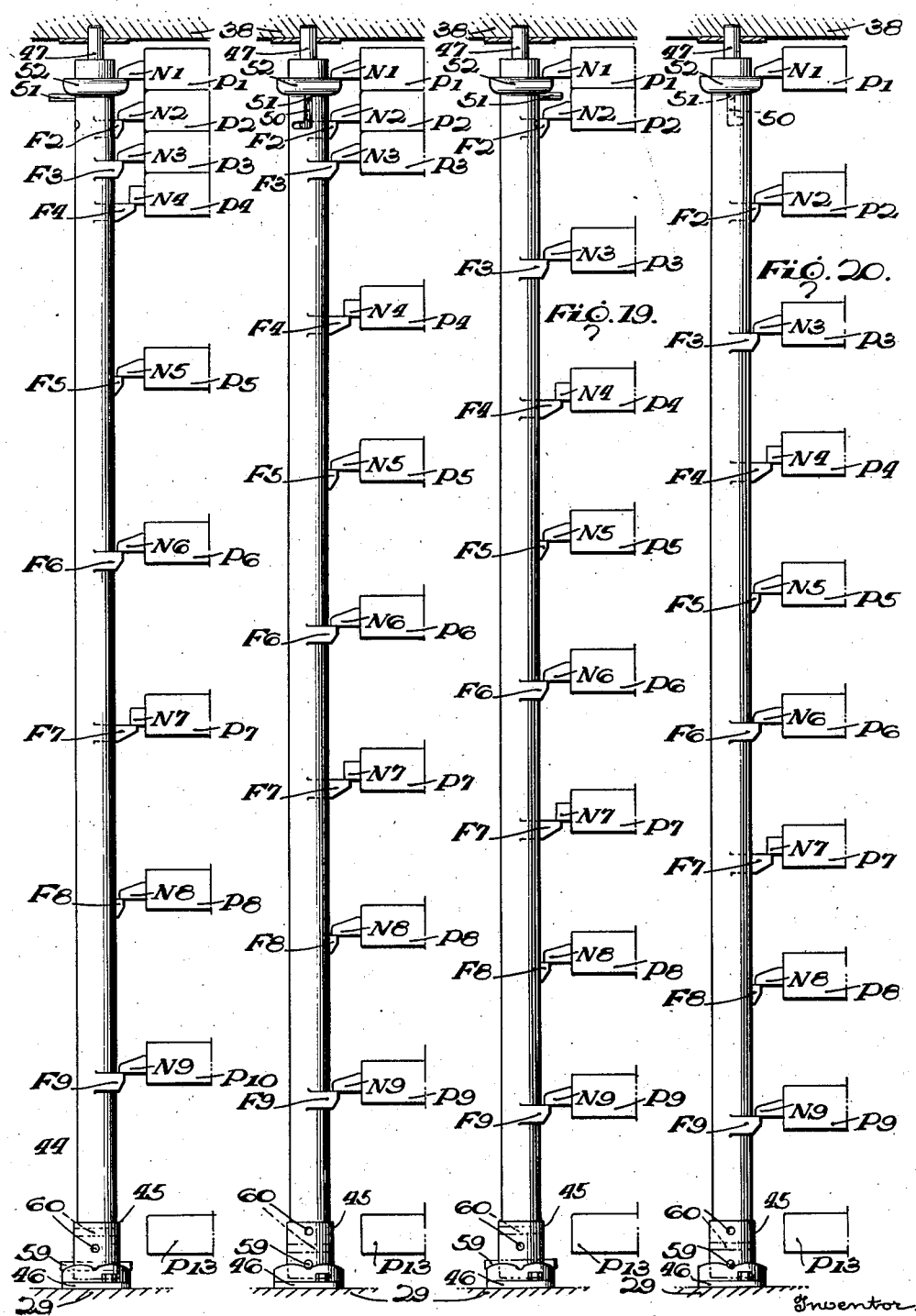

Patented May 26, 1942

2,283,923

UNITED STATES PATENT OFFICE 2,283,923

REFRIGERATING APPARATUS

Bicknell Hall, Boston, Mass., assignor to General Foods Corporation, New York, N. Y., a corporation of Delaware Application April 27, 1940, Serial No. 332,061

32 Claims. (Cl. 62—114)

This invention relates to refrigerating apparatus, and more particularly to devices of the character commonly known as "plate frosters" which embody a plurality of refrigerated plate-like elements mounted one above the other in a stack and movable vertically relatively to one another so as to receive and compress therebetween comestibles to be quick-frozen.

More specifically, the invention is directly concerned with mechanisms by which the plates of such devices may be supported when in their separated, non-freezing or loading positions, and by which the number of plates to be used in freezing at any given time may be varied so as to effect a variation in the maximum separation obtainable between said plates.

In the plate frosters of the prior art of the type exemplified by the patents to Birdseye and Hall, Nos. 1,822,123 and 1,905,131, the plates are permanently interconnected and at all times maintained in uniformly spaced relationship by lazy tong or pantograph arrangements of levers. There have also been used heretofore frosters in which the plates, while unconnected to one another, can be supported in only a single non-operating position by resting on pins fixed to immovable frame members of the froster housing. In all such constructions, however, it is impossible to change the maximum spacing obtainable between the plates without defrosting and draining the plates of refrigerant, disassembling the froster, bodily removing or inserting the necessary number of plates, and reconstructing either the lever connections between the plates or the fixed plate supporting members—an obviously difficult, expensive and time consuming operation. It is also impossible with these prior devices having interconnected plates to simultaneously freeze in different "stations" (as the spaces between the plates are customarily designated) products of different thicknesses, because the spacing of the plates is maintained equal throughout the stack no matter what the degree of separation thereof within the limits permitted by the equipment used.

As the art of quick-freezing comestibles has advanced during the past several years, the increase in the number and variety of products susceptible of preservation by quick-freezing has brought to light these inherent limitations upon the capacity and flexibility of the frosters heretofore used and has created a demand for freezing equipment capable of handling products of greater variation in thickness than can be taken care of by these prior devices.

It is therefore one of the objects of the present invention to produce an improved refrigerating device of the plate froster type of simple, efficiently operative construction which will be capable of fulfilling this demand in a highly satisfactory manner.

Another object is to provide a freezing apparatus of the plate type with novel means for quickly and easily varying the number of plates or stations in use and the maximum thickness of product that can be frozen therebetween, without defrosting and draining the system, dismantling the apparatus, or bodily removing or adding any plates.

A further object is to provide a plate froster having a fixed number of plates unconnected with one another and mechanism for supporting each of said plates in a plurality of different loading positions, said mechanism also including means for selectively maintaining one or more of the plates in an elevated, inoperative position so as to decrease the number of operating stations and thereby increase the maximum spacing obtainable between the plates in use.

Still another object is to provide an improved plate froster of the character just described wherein the means by which the plates may be supported in a plurality of different loading positions are readily adjustable from any one setting to any other when the plates are maintained in a predetermined, elevated relationship by the mechanism normally used for raising said plates into freezing position, in conjunction with spacer elements of various thicknesses interposed between certain of the plates in accordance with the teachings of the present invention.

A still further object is to provide a plate froster with rotatable elements of novel construction for selectively establishing the number of plates in use at any given time and the spacing therebetween when in loading position.

Another object is to provide a plate froster with novel means for supporting the plates in loading position which can be readily removed from the froster for repair or replacement without disturbing the plates.

These and other objects, including that of generally improving upon the structural and performance characteristics of the devices heretofore available to the art for similar purposes, will appear more fully upon a consideration of the detailed description of the invention which follows.

In general, the invention comprises a manually adjustable or variable mechanism for so supporting a certain definite number of froster plates in various positions as to provide different numbers of comestible receiving spaces or stations therebetween of different heights, this mechanism consisting essentially of a plurality of vertical rotatable members, hereinafter referred to as guide bars, positioned adjacent the edges of the plates and provided with outwardly projecting elements on which are adapted to rest cooperating members which project outwardly from the plates. Each guide bar is provided with a plurality of sets of these elements, four sets being shown in each of the embodiments herein disclosed, so as to provide a plurality of different station and plate spacing arrangements. In order to insure that the guide bars may be rotatably adjusted quickly and easily without interference between the projecting elements thereof and those of the plates, the invention also includes the provision of special spacer members of various thicknesses which are adapted to be interposed in a definite manner between certain, but not all, of the plates of the stack so that, when the plates are lifted off the supporting guide bar elements by the hydraulic ram which is also used for moving the plates upwardly to compress the comestibles therebetween during freezing, they will be maintained in a predetermined spaced apart relationship such that the guide bars may be freely rotated without interference.

Since, with a froster of definite height and a fixed number of plates, there is a maximum plate spacing or station height that can be obtained when using all of said plates for freezing, the present invention provides for increasing the station height by maintaining one or more of the plates in an elevated, inoperative position and respacing the remaining plates so as to divide up between them the space represented by the station or stations eliminated. It is thus possible, without changing the over-all height of the froster and without removing or adding any plates to vary the number of operating stations and the individual heights thereof by a simple adjustment of the mechanism, quickly and easily accomplished by a single operator.

In view of the fact that the cooperating guide bar and plate elements must be properly proportioned and positioned relatively to one another in order that the mechanism may operate in a practical manner, the showings of these elements in the accompanying drawings have been made approximately to scale so as to clearly disclose two specific ways of applying the principle underlying the present invention. Once the principle thus exemplified is clearly comprehended, it may be readily embodied in other structures by those skilled in the art. It is therefore to be expressly understood that the accompanying drawings and the various statements hereinafter made with respect to dimensions, numbers of plates and the like are illustrative only and are not to be construed as defining the limits of the invention, for which latter purpose reference is to be had to the appended claims.

In the drawings, wherein like reference characters indicate like parts throughout the several views:

Fig. 1 is a side elevation of one form of refrigerating device of the plate froster type embodying the present invention comprising thirteen plates and a maximum of twelve stations, the view being taken from the refrigerant supply side of the plates with the near wall and door of the insulated housing removed and other parts omitted in order to better disclose the construction to which the invention more directly relates, and showing the plates in the separated, non-freezing or loading position which they would occupy when all thirteen plates of the froster are to be used for the freezing;

Fig. 2 is a side elevation of the froster of Fig. 1, taken from the right as viewed in the latter figure and again omitting various elements which form no part of the present invention;

Fig. 3 is a plan view of the froster of Figs. 1 and 2 as the latter would appear with the top of the insulated housing removed and with the liquid refrigerant supply header and vapor discharge conduits shown in section at approximately the level of the top of said housing;

Fig. 4 is a plan view, on an enlarged scale, of one of the plate supporting guide bars and the cooperating portions of the plates shown in Figs. 1-3, to which elements the invention is particularly directed;

Fig. 4a is a horizontal sectional view through the lower portion of the guide bar shown in Fig. 4 taken substantially on the line 4a—4a of Fig. 2;

Fig. 5 is another horizontal sectional view of the guide bar of Fig. 4 taken through the upper portion thereof substantially on the line 5—5 of Fig. 2;

Fig. 6 is a side elevation, on an enlarged scale, of the left-hand guide bar and the cooperating portions of the plates illustrated in Fig. 2, but with the plates shown elevated out of supported engagement with the guide bar and with the special spacer members interposed between them in such manner as to permit the guide bar to be freely rotated to any desired position without interference between the projecting elements or fingers of the bar and the plate members or pins which otherwise rest upon the bar fingers and support the plates in loading position;

Fig. 7 is a side elevation of the plates of the froster, with the central portions thereof broken away, as they would appear when viewed from the left in Fig. 6 with the spacer members in place, this view being particularly adapted to illustrate the relative positions of the projecting pins of the various plates with respect to one another and the corners of said plates;

Figs. 8 and 9 are enlarged perspective views of the two types of plate pins employed in the present invention, Fig. 8 showing a long pin and Fig. 9 a short pin;

Figs. 10, 11, 12 and 13 are side elevations similar to Fig. 6 of a single guide bar and the cooperating portions of the plates showing the various positions in which the plates are supported when the guide bar is in each of its four different operating positions, Fig. 10 showing the positions occupied by the plates when in the nine station arrangement and Figs. 11, 12 and 13 corresponding to the ten, eleven and twelve station arrangements, respectively, each view showing only that set of bar fingers actually in use for supporting the plates, the other sets of fingers being omitted in the interest of clarity;

Figs. 14 and 15 are side elevations, similar in character to Figs. 6 and 7, of a second form of plate supporting mechanism embodying the invention, this embodiment comprising a total of ten froster plates and a maximum of nine stations;

Fig. 16 is a horizontal sectional view, similar in character to Fig. 5, of the guide bar of Fig. 14 taken substantially on the line 16—16 in said latter figure; and Figs. 17, 18, 19 and 20 are side elevations, similar in character to Figs. 10-13, of the guide bar and plates of Figs. 14-16 showing the six, seven, eight and nine station arrangements, respectively.

Referring now to Figs. 1-13, inclusive, it will be seen that the froster of the present invention is similar in general construction to those already known in that it comprises a plurality of horizontally disposed, hollow, rectangular, metallic plates P1, P2, P3, etc., mounted one above the other in a stack within an insulated housing 21, which plates are adapted to be raised and lowered in any suitable manner, as by a hydraulic ram 22 the piston of which is preferably permanently connected to the lowermost plate of the stack. The plates are unconnected to one another, but as the lowermost plate is elevated by the ram 22 from a non-freezing or loading position, the plates thereabove are successively picked up and raised through the medium of the comestibles to be frozen which occupy the spaces or stations between the plates until all of the plates are actually supported upon the lowermost one and the comestibles are compressed therebetween into good heat exchange contact with the surfaces thereof, whereupon freezing may be quickly accomplished through the medium of a volatile refrigerant circulated within the plates. In order to maintain the plates in proper vertical alignment, a vertical angle iron guide 23 may be provided at each corner of the stack, these guides being secured in place by any suitable means such as brackets 24 screwed to the walls of the froster housing 21.

The number of plates used in the froster will, of course, vary in different installations depending upon the capacity desired, the expected sizes of product to be frozen and the space available for the installation. The froster illustrated in Figs. 1-13 consists of thirteen plates forming a maximum of twelve freezing spaces or stations therebetween, each plate being approximately two inches thick and the space between adjacent plate surfaces being slightly greater than two and one-half inches when the plates are in their fully separated or loading position as shown in Figs. 1, 2 and 13.

Mounted on top of the froster housing 21 is a tank or surge drum 25 wherein is contained a supply of a suitable volatile liquid refrigerant, such as ammonia, delivered thereto through a supply line 26. Liquid refrigerant from the surge drum 25 is supplied to the plates through a vertical supply header 27 which is connected to the bottom of the drum near one end thereof by means of a pipe 28 and extends downwardly inside the housing adjacent one corner of the plate stack. The bottom end of header 27 passes through the floor 29 of the freezing chamber of the housing 21 and into the space between said floor and the base 30 of the froster, the lower extremity of the header being provided with a suitable valve 31 which is normally closed but may be opened for the purpose of draining the liquid refrigerant from the system, when desired.

The plates are connected in parallel to liquid supply header 27 by a plurality of flexible conduits or hoses 32 (only fragmentarily shown in Fig. 1), each hose being connected at one end to one of the plates by means of a nipple 33 fixed to the plate adjacent one corner thereof, while the other end is connected to a second nipple 34 leading into the header 27. The refrigerant thus supplied to the plates circulates therein through a plurality of passageways or tubes arranged in series, series-parallel or parallel in a manner already known to the art, the vapor discharge ends of the tubes within each plate communicating with an outwardly extending discharge nipple 35 preferably located adjacent the corner of the plate diagonally opposite that at which the supply nipple 33 is positioned. In order to remove from the plates the vapor generated therein when the liquid refrigerant absorbs heat through the walls thereof, each plate discharge nipple 35 is connected to one end of a second flexible conduit or hose 36 which extends upwardly and connects at its opposite end with the bottom end of a vapor discharge pipe 37 leading upwardly through the roof 38 of the froster housing 21. The vapor discharge pipes 37 are supported in any suitable manner, as by a plate 39, with their upper ends extending into the surge drum 25 a predetermined distance above the normal level of the liquid refrigerant therein so as to discharge into the vapor space in the upper portion of the drum. The vapor discharged into the surge drum from the pipes 37 may be withdrawn from the drum through a suction connection 40 which extends vertically downwardly into the drum closely adjacent the same end thereof as that at which the header supply pipe 28 is connected, the vapor passing from the suction connection 40 through a suitable pipe 41 to a compressor 42 and thence into a condenser 43 wherein it is returned to liquid form under relatively high pressure. From the condenser 43 the liquid refrigerant may be returned to the surge drum 25 through the liquid supply line 26.

In order to attain the desired objective of ready adjustability of the spacing of the plates when the latter are in their separated, non-freezing or loading positions, the present invention provides a novel form of support for the plates in the form of a plurality of vertical, rotatable members, known as guide bars, positioned in the froster housing closely adjacent the edges of the plate stack and each equipped with a plurality of vertically spaced elements projecting outwardly from different portions of the periphery thereof adapted to receive and support on their upper surfaces cooperating projections carried by the plates. In the embodiment illustrated, four such guide bars B1, B2, B3 and B4 are provided, located (see Fig. 3) along the two opposite edges of the plates with which the liquid supply and vapor discharge hoses 32 and 36 are associated and inwardly from the corners of said plates, thus leaving the other two edges unobstructed to facilitate the loading and unloading of comestibles. Since all of the guide bars are identical in construction, the description of one will suffice for all.

As will be seen best from Figs. 4-6, each guide bar is of a length slightly less than the inside vertical dimension of the froster housing 21, and comprises a solid cylindrical body portion 44 and a base portion 45 of slightly greater diameter which is stepped in a socketed bearing member 46 suitably secured to the floor 29 of the housing 21. The upper end of the body portion 44 of the bar is provided with an axial bore in which is slidably housed a positioning and retaining pin 47, the upper end of said pin projecting upwardly beyond the end of the bar and into a suitable recess 48 formed in the roof 38 of the housing 21. In order to permit the guide bar to be readily removed from the froster for repair or replacement, a coil spring 49 is interposed between the lower ends of pin 47 and the bore in which the latter is mounted, which spring normally urges said pin upwardly into the position shown in Fig. 6, and an elbow shaped slot 50 is formed in the wall of the guide bar communicating with said bore through which extends a horizontal operating pin 51 threaded into the pin 47. By pulling down on pin 51, positioning pin 47 may be retracted against the spring 49 sufficiently to withdraw its upper end from recess 48, whereupon the guide bar can be tilted out of position and then lifted out of its bearing 46, it being understood that the internal diameter of the socket in the latter is sufficiently larger than that of the base portion 45 of the guide bar to permit this tilting. Normally, however, the seating of base portion 45 in bearing 46 and the engagement of pin 47 in recess 48 hold the guide bar in proper vertical position and prevent any objectionable sidewise motion thereof relatively to the plates, the weight of the guide bar and the load of the plates carried thereby being directly transmitted to the bottom of the socket in bearing 46 and thence to the froster housing.

Projecting horizontally from the periphery of each guide bar, and suitably spaced both peripherally and axially of the bar to provide the desired number of variations in plate spacing, are the plate supporting elements which, with the exception of that adapted to support the uppermost plate P1 of the stack, will hereinafter be referred to as fingers and will be designated F2, F3, F4, etc., to indicate the particular plate with which they are intended to cooperate. The uppermost plate P1 is supported by means of a collar 52 extending continuously around the guide bar adjacent the upper end thereof, just above the upper end of the elbow shaped slot 50 through which operating pin 51 projects. Inasmuch as the lowermost plate P13 is, as above pointed out, preferably fixed to the piston of the hydraulic ram 22, it is not necessary to provide the guide bar with supporting fingers for this plate. Each guide bar, including its collar 52 and fingers F2, F3, F4 . . . F12, is preferably made as an integral steel casting.

The specific arrangement of the guide bar fingers illustrated in Figs. 1-13 is particularly adapted for use with a thirteen plate froster and for so adjusting these thirteen plates as to permit them to be used with either twelve, eleven, ten or nine freezing stations, as desired, the plate spacing or station height increasing as the number of stations is decreased. To this end, each guide bar is provided with four different sets of fingers F2, F3, F4 . . . F12 projecting from the four quadrants of the periphery of the bar at right angles to one another, the four sets of fingers corresponding to the four desired arrangements of the plates, i. e., into twelve, eleven, ten and nine stations, respectively. The fingers of each set are not only arranged at different elevations along the length of the guide bar in accordance with the positions at which it is desired to support the corresponding plates, but are also located in three different vertical rows designated A, B and C in the drawings. It will also be noted that there are some short fingers and some long ones in each set, but that all of the short fingers in each set terminate in a single vertical plane perpendicular to the length of said fingers, while the long fingers of each set do likewise.

In order to cooperate with the collars 52 and fingers F2, F3, F4 . . . F12 of the guide bars B1, B2, B3 and B4, each of the plates of the stack, with the exception of the bottommost plate P13, is provided with four sets of lug-like elements, hereinafter termed pins, which project outwardly from the two edges of the plate along which the guide bars are located in proper position to rest upon the upper surfaces of the guide bar collars and fingers when the plates are lowered to their non-freezing or loading positions. As in the case of the guide bar fingers, the plate pins of each set will be designated N1, N2, N3 . . . N12 in accordance with the plate with which they are associated, and are arranged in rows A, B and C directly opposite the corresponding rows of fingers of the set on each guide bar which happens to be in plate supporting position.

The plate pins are also made in two lengths, the long pins being adapted to rest on and cooperate with the short fingers of the guide bars, while the short pins are similarly adapted to cooperate with the long fingers. Each of the long pins is of the construction illustrated in Fig. 8, comprising a threaded shank or stem 53 which is adapted to engage a correspondingly threaded hole in the plate, and an elongated block-like body portion 54 having a beveled upper surface 55. All of the guide bar collars and fingers are preferably similarly beveled on their undersides, as appears most clearly in Fig. 6. Each of the short plate pins, illustrated in Fig. 9, is also provided with a threaded shank 53, but the body 56 thereof is shorter than that of a long pin and of unbeveled, rectangular form. As will be seen from Fig. 4, the horizontal widths of all plate pins and bar fingers are equal.

The corresponding fingers of each of the four sets on each guide bar are of the same length and are positioned in the same row, the only variation being in the vertical positioning thereof relatively to the collar 52. That is, all fingers F2 which support the next to the top plate of the stack are short pins and are all positioned in row A; fingers F3 are all short and located in row C; fingers F4 are all long and in row A, etc. This correlated arrangement of the fingers is perhaps best illustrated by Figs. 10-13 which show the plates as they are positioned when supported by the fingers of each of the four sets, Figs. 10, 11, 12 and 13 illustrating the nine, ten, eleven and twelve station arrangements, respectively.

For example, in Fig. 13, the twelve station arrangement utilizing all thirteen plates for freezing, all of the fingers are equi-distantly spaced and finger F2 is located the same distance below collar 52 as is each finger from the one immediately above it, thereby dividing the total available height within the froster housing into twelve freezing stations of equal height. In the eleven station arrangement, illustrated in Fig. 12, the distance between finger F2 and the collar 52 is reduced to the thickness of one of the plates, the result being that the individual spacings between the fingers F2, F3 . . . F12 may be increased so as to provide eleven freezing stations of greater height than before, while the uppermost plate P1 is maintained in inoperative position as far as freezing is concerned. In the arrangement of Fig. 11, finger F3 has also been raised to a position in which it is spaced from finger F2 by a distance equal to the thickness of one of the plates, thereby rendering both plates P1 and P2 unavailable for freezing and permitting a further increase in the heights of the ten remaining stations between plates P3 to P13. In the nine station set up of Fig. 10, finger F4 has also been raised so as to eliminate the station otherwise formed between plates P3 and P4, and the fingers F5, F6 . . . F12 have been respaced to provide nine stations of even greater height. Note that in all of the four arrangements which it is possible to attain with the disclosed form of guide bar, the uppermost plate P1 and the bottommost plate P13 are at the same levels, the variations occurring in the positions of the intermediate plates P2, P3 ... P12.

The staggering of the guide bar fingers and plate pins in the three rows A, B and C, and the use of fingers and pins of two different lengths, are necessitated both because, when the plates are elevated by the ram 22 after the comestibles to be frozen have been loaded therebetween, certain of the plates (the number depending upon the thickness of the product being frozen) rise upwardly to positions above those of the bar fingers upon which the next higher plates were originally supported during the loading operation, and because there must be no interference between the bar fingers and plate pins when the guide bars are rotated for the purpose of changing from one station arrangement to another. Although it may be assumed that there are other combinations which will be operative for the desired purpose, particularly in frosters employing a total number of plates other than thirteen, the following table identifies the relative lengths and row positions of the bar fingers and plate pins shown in Figs. 1-13 which have proved satisfactory for use in a thirteen plate froster:

| Plate | Bar fingers | | | Plate pins | | |
|---|---|---|---|---|---|---|
| | No. | Length | Row | No. | Length | Row |
| P1 | Continuous collar | | | 52 | Long | B |
| P2 | F2 | Short | A | N2 | do | A |
| P3 | F3 | do | C | N3 | do | C |
| P4 | F4 | Long | A | N4 | Short | A |
| P5 | F5 | Short | B | N5 | Long | B |
| P6 | F6 | do | C | N6 | do | C |
| P7 | F7 | Long | A | N7 | Short | A |
| P8 | F8 | Short | B | N8 | Long | B |
| P9 | F9 | do | C | N9 | do | C |
| P10 | F10 | do | A | N10 | do | A |
| P11 | F11 | Long | A | N11 | Short | A |
| P12 | F12 | do | B | N12 | do | B |
| P13 | Supported by ram 22 | | | | | |

With bar fingers and plate pins of the relative lengths and positions thus indicated, and using plates of two inch thickness in a housing having an inside height of approximately five feet, the spacings obtainable between the plates when they are resting on their respective bar fingers in non-freezing or loading positions are as follows:

With twelve stations—approximately 2.6 inches.
With eleven stations—approximately 2.8 inches.
With ten stations—approximately 3.1 inches.
With nine stations—approximately 3.4 inches.

In order to make it possible to vary the station arrangement and plate spacing by simply rotating the guide bars, the present invention also includes the provision of means by which the plates may be raised off the supporting bar fingers to a single predetermined position such that the guide bars may be turned from any one setting to any other without interference between the bar fingers and plate pins, and regardless of the spacing of the plates at the time when it is desired to make the change. For this purpose, there has been devised a set of spacer members of certain definite sizes which are adapted to be interposed between certain of the plates of the stack so that, when the entire stack is elevated by the ram 22 until all of the plates "go solid" with the interposed spacer members and one another and the uppermost plate P1 comes into engagement with the roof 38 of the froster housing, the plate pins will occupy such positions that the guide bars can be freely rotated in either direction and to any desired angular extent without having any bar finger come into contact with any plate pin. In this connection, it should be noted (as clearly appears in the drawings) that the lengths of the short bar fingers and plate pins are such that they clear one another even when positioned in the same horizontal plane.

As is shown in Figs. 6 and 7, the desired result is obtained in the present embodiment of the invention by the use of a set of nine spacer members S4, S5, S6 ... S12, the approximate heights of which, and the locations in which they must invariably be placed, are as follows:

| Spacer | Height | Location |
|---|---|---|
| | Inches | |
| S4 | 1.00 | Between plates P4 and P5. |
| S5 | 2.50 | Between plates P5 and P6. |
| S6 | 1.50 | Between plates P6 and P7. |
| S7 | 2.13 | Between plates P7 and P8. |
| S8 | 2.50 | Between plates P8 and P9. |
| S9 | 1.63 | Between plates P9 and P10. |
| S10 | .38 | Between plates P10 and P11. |
| S11 | 2.38 | Between plates P11 and P12. |
| S12 | 2.50 | Between plates P12 and P13. |

It will be noted from the foregoing tabulation that the tallest of these spacer members, S5, S8 and S12, are of a dimension slightly less than the 2.6 inch spacing provided between the plates when the latter are in the twelve station arrangement. Consequently, the spacer members may always be properly inserted between the plates when the latter are in any of the four station arrangements obtainable with the apparatus disclosed.

In order to make the change from any one adjustment of the guide bars to any other, the plates are first lowered into the loading position determined by the existing setting of the guide bars, and then the spacer members S4, S5, S6 ... S12 are interposed between the plates in accordance with the above tabulation and the showing of Figs. 6 and 7. Preferably, two of each of these spacer members are provided so that they may be placed adjacent opposite edges of the plates to avoid any possibilty of tilting of the latter as they are raised. The entire stack is then elevated by the ram 22 to the position indicated in Figs. 6 and 7, whereupon the guide bars may be rotated to any selected setting. The plates are then again lowered until they come to rest upon their respective bar fingers in the new station arrangement, the spacer members are removed and the operative stations are ready for loading in the usual manner with the comestibles to be frozen.

Rotation of the guide bars and their retention in any one of the four operating positions may be facilitated by constructing the base portions of the guide bars and the socketed bearing members in which they are mounted in the manner illustrated in the drawings. As shown best in Figs. 4a and 6, each bearing member 46 is provided with a vertical cylindrical boss 57 in which is formed the socket receiving the bottom of base portion 45 of the guide bar, the upper surface of this boss having formed therein four radially disposed grooves 58 located at 90° intervals around its periphery, two of said grooves being perpendicular to, and the other two parallel to, the adjacent edge of the plate stack. The base portion 45 of each guide bar is provided with a horizontal pin 59 extending dimetrically therethrough and projecting beyond the periphery thereof at both sides a distance approximating the radial width of the boss 57, the vertical location of the pin 59 being such that, when the base portion 45 of the guide bar is seated on the bottom of the socket in the bearing member 46, the pin rests in two of the grooves 58. Inasmuch as the pin 59 is also located in the same vertical plane with the fingers in rows B of two of the oppositely disposed sets of fingers on the guide bar, it will be seen that one of said sets is always presented in proper plate supporting position whenever the pin 59 is resting in the grooves 58. The base portion 45 of each guide bar is also provided with a pair of diametrically extending holes 60, located at different levels above pin 59 and at right angles to one another, into which any suitable implement, such as a rod, may be inserted when it is desired to rotate the guide bar. If desired, the portions of the upper surface of boss 57 intermediate the grooves 58 may be rounded convexly upwardly as indicated at 61 in order to assist in properly locating the pin 59 in the grooves 58 and in preventing rotation of the guide bar except when turned with the proper tool.

In Figs 14–20, inclusive, there is shown another embodiment of the plate supporting mechanism of the present invention which is particularly adapted for use in a froster having a total of ten plates and a maximum of nine freezing stations, and which is so designed as to enable a decrease in the number of stations to eight, seven or six with a corresponding increase in the heights of the stations.

The ten plates of this second form of the invention are identical in construction, including the plate pins, with the uppermost nine plates P1, P2, P3 ... P9 and the bottommost plate P13 of the embodiment of Figs. 1–13. That is, in so far as the plates are concerned, the froster of Figs. 14–20 could be produced by simply withdrawing plates P10, P11 and P12 of the froster shown in Figs. 1–13.

The guide bars of Figs. 14–20 are also of the same construction as those of the first embodiment, except that the fingers F10, F11 and F12 have been omitted and the other fingers have been spaced further apart so as to provide stations of greater height than are attainable with the thirteen plate froster of Figs. 1–13. The fingers F2, F3, F4 ... F9 of Figs. 14–20 are of the same relative lengths, and are respectively positioned in the same vertical rows, as the corresponding fingers of Figs. 1–13. The difference between the showing of Fig. 16 and that of Fig. 5 is due to the fact that, since there are no fingers F12 in the second form of the invention, Fig. 16 does not show a long finger in row B of each set as does Fig. 5. A comparison of Figs. 16 and 5 will also indicate that the relative peripheral locations of the six and seven station sets of fingers on each guide bar of the second embodiment are reversed with respect to those of the nine and ten station sets of Figs. 1–13.

Assuming plates of the same thickness and a froster housing of the same inside height as previously described in the case of Figs. 1–13, the spacings obtainable between the plates of Figs. 14–20 when they are resting on their respective bar fingers in non-freezing or loading positions are as follows:

With nine stations—approximately 4.1 inches.
With eight stations—approximately 4.6 inches.
With seven stations—approximately 5.3 inches.
With six stations—approximately 6.2 inches.

Because of the smaller number of plates and the relatively greater plate spacings provided thereby in the structure of Figs. 14–20, the spacer members S4, S5, S6, etc., of the first embodiment are not suitable for use in the second construction and a new set must be provided. Accordingly, there is provided another set of six spacers S'4, S'5, S'6 ... S'9 which, when inserted between the seven lowermost plates of the stack of this second embodiment of the invention, and when said stack is elevated to the position shown in Figs. 14 and 15, will maintain the plates in such positions that the guide bars may be freely rotated without interference between the fingers thereof and the pins of the plates. The approximate heights of the spacer members S'4, S'5, S'6 ... S'9, and the locations in which they must invariably be placed in order to obtain the desired result, are as follows:

| Spacer | Height | Location |
|---|---|---|
|  | Inches |  |
| S'4 | 1.75 | Between plates P4 and P5. |
| S'5 | 4.00 | Between plates P5 and P6. |
| S'6 | 2.75 | Between plates P6 and P7. |
| S'7 | 4.00 | Between plates P7 and P8. |
| S'8 | 3.25 | Between plates P8 and P9. |
| S'9 | 4.00 | Between plates P9 and P13. |

As in the case of the first embodiment, it will be noted that the tallest of these spacer members, S'5, S'7 and S'9, are of a dimension slightly less than the 4.1 inch spacing provided between the plates when the latter are in the nine station arrangement, with the result that they may always be properly inserted between the plates when the latter are in any of the four station arrangements obtainable with the mechanism disclosed.

Aside from the differences specifically pointed out, the structure and mode of operation of the embodiment of Figs. 14–20 are the same as previously described in connection with the froster of Figs. 1–13.

There is thus provided by the present invention a new and improved mechanism for supporting the plates of a refrigerating apparatus of the plate froster type by which the spacing between the plates may be readily varied to accommodate products to be frozen of different thicknesses, and wherein the variations in plate spacing may be effected without removing or adding any plates, and with a minimum expenditure of time and labor. The increase in flexibility of operation thus obtained adds materially to the utility of each froster, and enables any particular apparatus equipped with a definite number of plates to handle a much wider range of products than has been possible with the frosters heretofore known. With the structure of the present invention, the operator of a plate froster may vary the number of operating or freezing stations and the spacings between the operating plates to suit the requirements of the products being frozen by merely elevating the plates to a predetermined position with the aid of the special spacer members and then rotating the guide bars to the desired setting, whereupon lowering of the plates until they come to rest upon the supporting fingers of the bars automatically positions them in the selected arrangement. The change is thus made without withdrawing the froster from service and draining the system of refrigerant, and without requiring any structural change in the apparatus, as have been necessary heretofore when plates must be removed or added to produce a variation in station arrangement. Another advantage of the present structure is that, due to the absence of any permanent interconnections between the plates, products of different thicknesses may be frozen simultaneously by simply placing them in different stations, the guide bars being so adjusted as to provide a plate spacing sufficiently great to accommodate the thickest product to be treated. These and other features of the invention, including its simplicity of structure, its flexibility and its ease and rapidity of operation, characterize it as a marked improvement over the frosters of the prior art.

Although only one specific type of plate froster and two specifically different forms of guide bar and associated elements have been described and illustrated in the accompanying drawings, it should be obvious that the invention is not limited to the particular structures shown but is capable of a variety of mechanical embodiments. For example, instead of supporting the uppermost and lowermost plates of the stack by collars on the guide bars and the hydraulic ram, respectively, it should be apparent that the guide bars could be provided with suitably positioned fingers for this purpose and the ram left without a permanent connection to the bottom plate. Likewise, while each of the two forms of guide bar illustrated is provided with four sets of plate supporting fingers, thereby affording four variations of plate spacing and station arrangement, it will be recognized that the number of such sets of fingers may be changed, as desired, depending upon requirements and manufacturing limitations. Various other modifications, which will now become apparent to those skilled in the art, may also be made in the form, details of construction and arrangement of the individual elements of the mechanism without departing from the underlying concept of the invention. Reference is therefore to be had to the appended claims for a definition of the limits of the invention.

What is claimed is:

1. A refrigerating apparatus comprising a plurality of horizontally disposed refrigerated plates mounted one above the other in a stack in unconnected relationship and movable relatively to one another to receive and compress therebetween comestibles to be frozen, and manually variable means common to said plates for supporting the same in any selected one of a plurality of differently spaced, non-freezing or loading positions.

2. A refrigerating apparatus comprising a plurality of horizontally disposed refrigerated plates mounted one above the other in a stack and movable relatively to one another to receive and compress therebetween comestibles to be frozen, means common to said plates for supporting the same in separated, non-freezing or loading position, and means for varying the positions in which said plates are supported by said supporting means.

3. A refrigerating apparatus for freezing comestibles comprising a plurality of horizontally disposed refrigerated plates mounted one above the other in a stack in unconnected relationship, adjustable means for supporting said plates in a plurality of separated, non-freezing or loading positions, the spacings between said plates when the latter are supported in any one of said positions being different from those when the plates are in any other of said positions, and means associated with the lowermost plate in said stack for elevating said plates with comestibles interposed therebetween from any of said loading positions to a freezing position wherein the comestibles between the plates are compressed into freezing contact therewith.

4. A refrigerating apparatus comprising a plurality of horizontally disposed refrigerated plates mounted one above the other in a stack and movable relatively to one another to receive and compress therebetween comestibles to be frozen, and rotatable means common to said plates for supporting the same in separated, non-freezing or loading position, said means being effective upon rotation to vary the spacing existing between said plates when the latter are supported thereby.

5. A refrigerating apparatus comprising a plurality of horizontally disposed refrigerated plates mounted one above the other in a stack and movable relatively to one another to receive and compress therebetween comestibles to be frozen, rotatable means adjacent each corner of the plate stack having projections thereon for supporting said plates at predetermined distances from one another, and cooperating projections on said plates, said means being effective upon rotation to vary the spacing existing between said plates when the latter are supported thereby.

6. A refrigerating apparatus according to claim 5 wherein the projections on said rotatable means are arranged in two or more sets lying in different vertical planes.

7. A refrigerating apparatus according to claim 5 wherein the projections of said rotatable means are arranged in two or more sets lying in different vertical planes, the projections of at least one of said sets being so spaced as to support two or more of the uppermost plates of the stack in contact with one another.

8. A refrigerating apparatus according to claim 1 wherein said plate supporting means includes a plurality of vertical bars positioned adjacent the peripheries of said plates having plate supporting protuberances thereon, each of said bars having a plurality of sets of said protuberances projecting outwardly from different portions of the periphery of said bar, the protuberances of each set being spaced vertically from one another at different intervals than the protuberances of each other set so as to support said plates at different levels, said bars being rotatable about their vertical axes to bring any desired set of protuberances on each bar into plate supporting position.

9. A refrigerating apparatus according to claim 1 wherein said plate supporting means includes a plurality of vertical bars positioned adjacent the peripheries of said plates having plate supporting protuberances thereon and cooperating elements projecting outwardly from said plates adapted to engage said protuberances, each of said bars having a plurality of sets of said protuberances projecting outwardly from different portions of the periphery of said bar, the protuberances of each set being spaced vertically from one another at different intervals than the protuberances of each other set so as to support said plates at different levels, said bars being rotatable about their vertical axes to bring any desired set of protuberances on each bar into proper position to engage the cooperating elements of said plates.

10. A refrigerating apparatus comprising a plurality of horizontally disposed refrigerated plates mounted one above the other in a stack in unconnected relationship and movable relatively to one another to receive and compress therebetween comestibles to be frozen, adjustable means for supporting said plates in a plurality of separated, non-freezing or loading positions including a plurality of vertical bars positioned adjacent the peripheries of said plates having plate supporting protuberances thereon and cooperating elements projecting outwardly from said plates adapted to rest on said protuberances, each of said bars having a plurality of sets of said protuberances projecting outwardly from different portions of the periphery of said bar, the protuberances of each set being spaced vertically from one another at different intervals than the protuberances of each other set so as to support said plates at different levels and some of said protuberances being longer than others, the cooperating elements of said plates likewise varying in length inversely as the corresponding protuberances, and means for lifting said plates off said supporting protuberances and maintaining the same in a predetermined spaced apart relationship, the lengths of said protuberances and elements being so selected that said bars may be freely rotated without interference between said protuberances and said elements when said plates are supported by said last named means.

11. An element for supporting the plates of a refrigerating apparatus of the plate froster type in a plurality of differently spaced, non-freezing or loading positions consisting of a bar having a plurality of sets of plate supporting protuberances projecting outwardly from different portions of the periphery of said bar, the protuberances of each set being spaced axially from one another at different intervals than the protuberances of each other set, said bar being rotatable about its axis to bring any desired set of protuberances into plate supporting position.

12. An element for supporting the plates of a refrigerating apparatus of the plate froster type in a plurality of differently spaced, non-freezing or loading positions consisting of a vertical bar having a continuous collar adjacent the upper end thereof for supporting the uppermost plate of the apparatus at a constant level and a plurality of sets of plate supporting protuberances projecting outwardly from different portions of the periphery of said bar below said collar, the protuberances of each set being spaced vertically from one another and from said collar at different intervals than the protuberances of each other set, said bar being rotatable about its axis to bring any desired set of protuberances into plate supporting position.

13. An element for supporting the plates of a refrigerating apparatus of the plate froster type in a plurality of differently spaced, non-freezing or loading positions consisting of a vertical bar having a continuous collar adjacent the upper end thereof for supporting the uppermost plate of the apparatus at a constant level and a plurality of sets of plate supporting protuberances projecting outwardly from different portions of the periphery of said bar below said collar, the protuberences of each set being spaced vertically from one another and from said collar at different intervals than the protuberances of each other set, said bar being rotatable about its axis to bring any desired set of protuberances into plate supporting position, the protuberances of at least one of said sets being so arranged that the interval between the uppermost protuberance of said set and said collar is substantially equal to the thickness of the plate adapted to be supported by said protuberance.

14. An element for supporting the plates of a refrigerating apparatus of the plate froster type in a plurality of differently spaced, non-freezing or loading positions consisting of a bar having a plurality of sets of plate supporting protuberances projecting outwardly from different portions of the periphery of said bar, the protuberances of each set being spaced axially from one another at different intervals than the protuberances of each other set, said bar being rotatable about its axis to bring any desired set of protuberances into plate supporting position, an axial bore in the upper end of said bar, a positioning pin slidably mounted in said bore, and means yieldably urging said pin upwardly to a position wherein its upper end projects beyond the end of said bar.

15. In a refrigerating apparatus of the type embodying a plurality of horizontally disposed, refrigerated plates mounted one above the other in a stack and movable vertically relatively to one another to receive and compress therebetween comestibles to be frozen, a mechanism for varying the number of plates of the stack to be used for the freezing operation and the maximum vertical spacing obtainable therebetween without removing any of said plates from the stack comprising a plurality of vertical bars positioned adjacent the edges of said plates having outwardly projecting elements for supporting said plates in non-freezing or loading position, members projecting outwardly from said plates adapted to cooperate with said elements in supporting said plates, each of said bars having a plurality of sets of said elements projecting from different portions of the periphery of said bar, the elements of each set being spaced vertically from one another at different intervals than the elements of each other set so as to support said plates at different levels, and means for rotating said bars about their vertical axes to bring any desired set of elements on each bar into plate supporting position.

16. In a refrigerating apparatus of the type embodying a plurality of horizontally disposed, refrigerated plates mounted one above the other in a stack and movable vertically relatively to one another to receive and compress therebetween comestibles to be frozen, a mechanism for varying the number of plates of the stack to be used for the freezing operation and the maximum vertical spacing obtainable therebetween without removing any of said plates from the stack comprising a plurality of vertical bars positioned adjacent the edges of said plates having outwardly projecting elements for supporting said plates in non-freezing or loading position, members projecting outwardly from said plates adapted to cooperate with said elements in supporting said plates, each of said bars having a plurality of sets of said elements projecting from different portions of the periphery of said bar, the elements of each set being spaced vertically from one another at different intervals than the elements of each other set so as to support said plates at different levels and at least one of said sets on each bar being so arranged as to hold one or more of the uppermost plates of the stack in an elevated, non-operating position, and means for rotating said bars about their vertical axes to bring any desired set of elements on each bar into plate supporting position.

17. In a refrigerating apparatus of the type embodying a plurality of horizontally disposed, refrigerated plates mounted one above the other in a stack and movable vertically relatively to one another to receive and compress therebetween comestibles to be frozen, a mechanism for varying the number of plates of the stack to be used for the freezing operation and the maximum vertical spacing obtainable therebetween without removing any of said plates from the stack comprising a plurality of vertical bars positioned adjacent the edges of said plates having outwardly projecting elements for supporting said plates in non-freezing or loading position, members projecting outwardly from said plates adapted to cooperate with said elements in supporting said plates, each of said bars having a plurality of sets of said elements projecting from different portions of the periphery of said bar, the elements of each set being spaced vertically from one another at different intervals than the elements of each other set so as to support said plates at different levels, means for rotating said bars about their vertical axes to bring any desired set of elements on each bar into plate supporting position, and additional means for supporting said plates with the outwardly projecting members thereof in non-interfering position with respect to said elements during the time when said bars are being rotated.

18. In a refrigerating apparatus of the type embodying a plurality of horizontally disposed, refrigerated plates mounted one above the other in a stack and movable vertically relatively to one another to receive and compress therebetween comestibles to be frozen, a mechanism for varying the number of plates of the stack to be used for the freezing operation and the maximum vertical spacing obtainable therebetween without removing any of said plates from the stack comprising a plurality of vertical bars positioned adjacent the edges of said plates having outwardly projecting elements for supporting said plates in non-freezing or loading position, members projecting outwardly from said plates adapted to cooperate with said elements in supporting said plates, each of said bars having a plurality of sets of said elements projecting from different portions of the periphery of said bar, the elements of each set being spaced vertically from one another at different intervals than the elements of each other set so as to support said plates at different levels, means for rotating said bars about their vertical axes to bring any desired set of elements on each bar into plate supporting position, and additional means for supporting said plates with the outwardly projecting members thereof in non-interfering position with respect to said elements during the time when said bars are being rotated, including means for elevating the lowermost plate of said stack, and spacing members of various heights adapted to be interposed between certain of said plates to maintain the latter in a predetermined spaced relationship when the entire stack is raised off the supporting elements of said bars by elevation of said lowermost plate.

19. In a refrigerating apparatus of the type embodying a plurality of horizontally disposed, refrigerated plates mounted one above the other in a stack and movable vertically relatively to one another to receive and compress therebetween comestibles to be frozen, a mechanism for varying the number of plates of the stack to be used for the freezing operation and the maximum vertical spacing obtainable therebetween without removing any of said plates from the stack comprising a plurality of vertical bars positioned adjacent the corners of said plates having outwardly projecting fingers for supporting all but the uppermost and lowermost plates of the stack in non-freezing or loading position, a continuous collar on each of said bars for supporting said uppermost plate, means permanently associated with said lowermost plate for supporting, elevating and lowering the same, members projecting outwardly from all but said lowermost plate adapted to cooperate with said collar and fingers in supporting said plates, each of said bars having a plurality of sets of said fingers projecting from different portions of the periphery of said bar, the fingers of each set being spaced vertically from one another at different intervals than the fingers of each other set so as to support said plates at different levels, and means for rotating said bars about their vertical axes to bring any desired set of fingers on each bar into plate supporting position.

20. In a refrigerating apparatus of the type embodying a plurality of horizontally disposed, refrigerated plates mounted one above the other in a stack and movable vertically relatively to one another to receive and compress therebetween comestibles to be frozen, a mechanism for varying the number of plates of the stack to be used for the freezing operation and the maximum vertical spacing obtainable therebetween without removing any of said plates from the stack comprising a plurality of vertical bars positioned adjacent the corners of said plates having outwardly projecting fingers for supporting said plates in non-freezing or loading position, members projecting outwardly from said plates adapted to cooperate with said fingers in supporting said plates, the members adapted to cooperate with the fingers of each of said bars being arranged in a plurality of vertical rows, each of said bars having a plurality of sets of said fingers projecting from different portions of the periphery of said bar, the fingers of each set being positioned in a plurality of vertical rows, corresponding in number and alignment with the rows in which said plate members are positioned, and spaced vertically from one another at different intervals than the fingers of each other set so as to support said plates at different levels, and means for rotating said bars about their vertical axes to bring any desired set of fingers on each bar into plate supporting position.

21. In a refrigerating apparatus of the type embodying a plurality of horizontally disposed, refrigerated plates mounted one above the other in a stack and movable vertically relatively to one another to receive and compress therebetween comestibles to be frozen, a mechanism for varying the number of plates of the stack to be used for the freezing operation and the maximum vertical spacing obtainable therebetween without removing any of said plates from the stack comprising a plurality of vertical bars positioned adjacent the corners of said plates having outwardly projecting fingers for supporting all but the uppermost and lowermost plates of the stack in non-freezing or loading position, a continuous collar on each of said bars for supporting said uppermost plate, means permanently associated with said lowermost plate for supporting, elevating and lowering the same, members projecting outwardly from all but said lowermost plate adapted to cooperate with said collar and fingers in supporting said plates, each of said bars having a plurality of sets of said fingers projecting from different portions of the periphery of said bar, the fingers of each set being spaced vertically from one another at different intervals than the fingers of each other set so as to support said plates at different levels, means for rotating said bars about their vertical axes to bring any desired set of fingers on each bar into plate supporting position, and additional means including that permanently associated with said lowermost plate for supporting said plates with the outwardly projecting members thereof in non-interfering position with respect to said fingers during the time when said bars are being rotated.

22. In a refrigerating apparatus of the type embodying a plurality of horizontally disposed, refrigerated plates mounted one above the other in a stack and movable vertically relatively to one another to receive and compress therebetween comestibles to be frozen, a mechanism for varying the number of plates of the stack to be used for the freezing operation and the maximum vertical spacing obtainable therebetween without removing any of said plates from the stack comprising a plurality of vertical bars positioned adjacent the corners of said plates having outwardly projecting fingers for supporting all but the uppermost and lowermost plates of the stack in non-freezing or loading position, a continuous collar on each of said bars for supporting said uppermost plate, means permanently associated with said lowermost plate for supporting, elevating and lowering the same, members projecting outwardly from all but said lowermost plate adapted to cooperate with said collar and fingers in supporting said plates, each of said bars having a plurality of sets of said fingers projecting from different portions of the periphery of said bar, the fingers of each set being spaced vertically from one another at different intervals than the fingers of each other set so as to support said plates at different levels, means for rotating said bars about their vertical axes to bring any desired set of fingers on each bar into plate supporting position, and additional means for supporting said plates with the outwardly projecting members thereof in non-interfering position with respect to said fingers during the time when said bars are being rotated including spacing members of various heights adapted to be interposed between certain of said plates to maintain the latter in a predetermined spaced relationship when the entire stack is raised off the supporting fingers of said bars by elevation of said lowermost plate.

23. A refrigerating apparatus according to claim 15 wherein all of said bars are positioned adjacent two only of the edges of said plates, thereby leaving the other edges unobstructed for purposes of loading and unloading the comestibles being frozen.

24. A refrigerating apparatus according to claim 15 having four of said bars positioned along two only of the edges of said plates inwardly from the corners thereof, thereby leaving the other edges unobstructed for purposes of loading and unloading the comestibles being frozen.

25. A refrigerating apparatus according to claim 15 wherein each of said bars is provided with four sets of plate supporting elements to provide four different arrangements of said plates when in loading position.

26. A refrigerating apparatus according to claim 17 wherein each of said bars is so mounted in the apparatus as to be individually removable therefrom when the plates are supported by said last named means.

27. A refrigerating apparatus according to claim 17 including an insulated housing for said plates, a bearing fixed to said housing for the lower end of each of said bars, and a releasable connection between the upper end of each of said bars and said housing for normally maintaining said bar in proper vertical position but permitting removal thereof from the apparatus when the plates are supported by said last named means.

28. A refrigerating device of the type adapted for quick-freezing of comestibles comprising a plurality of flat refrigerated plates, means common to said plates for supporting the same in parallel relationship, and means for adjusting said supporting means to vary the number and size of the openings between said plates.

29. In a device of the type adapted to transfer heat between a plurality of flat plates arranged in parallel relationship to one another and material placed between said plates, means common to said plates for supporting the same in parallel relationship to one another with predetermined spacings between adjacent plates, and means for adjusting said supporting means so as to maintain at least two of said plates in direct contact with one another, thereby varying the number and width of the effective material receiving spaces between said plates.

30. In a device of the type adapted to transfer heat between a group of hollow metal plates through which a heat transfer medium is circulated and material placed between said plates, means for supporting said plates in parallel relationship to one another comprising a bar mounted adjacent each corner of said group of plates having a plurality of sets of projections formed thereon adapted to engage and support said plates, the projections of each of said sets being so spaced as to support the plates with different spacings therebetween than the projections of each of the other sets, and means for rotating said bars to vary the spaces between said plates to suit the thickness of the material to be placed therebetween.

31. In a device of the type adapted to transfer heat between a plurality of hollow metal plates through which a heat transfer medium is circulated and material placed between said plates, means for supporting each of said plates in a plurality of different positions, including means for selectively maintaining one or more of said plates in a non-operative position so as to decrease the number of available heat transfer stations between said plates and thereby increase the maximum spacing obtainable between the plates in use.

32. A refrigerating apparatus comprising a plurality of horizontally disposed refrigerated plates mounted one above the other in a stack and movable relatively to one another to receive and compress therebetween comestibles to be frozen, projections on said plates, and means adjacent the plate stack cooperating with said projections for supporting said plates at predetermined distances from one another, said means being adjustable to support said plates in any one of a plurality of different positions.

BICKNELL HALL.